United States Patent
Obezuk

(10) Patent No.: US 11,240,172 B2
(45) Date of Patent: Feb. 1, 2022

(54) METHODS AND APPARATUSES FOR RESPONDING TO REQUESTS FOR NETWORK RESOURCES IMPLEMENTED IN A CLOUD COMPUTING INFRASTRUCTURE

(71) Applicant: CLOUDFLARE, INC., San Francisco, CA (US)

(72) Inventor: Timothy Obezuk, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 17/126,717

(22) Filed: Dec. 18, 2020

(65) Prior Publication Data

US 2021/0194820 A1 Jun. 24, 2021

Related U.S. Application Data

(60) Provisional application No. 62/952,018, filed on Dec. 20, 2019.

(51) Int. Cl.
*H04L 12/923* (2013.01)
*H04L 12/911* (2013.01)
*H04L 29/08* (2006.01)

(52) U.S. Cl.
CPC .......... *H04L 47/762* (2013.01); *H04L 47/781* (2013.01); *H04L 47/822* (2013.01); *H04L 67/1095* (2013.01); *H04L 67/28* (2013.01)

(58) Field of Classification Search
CPC ... H04L 47/762; H04L 47/781; H04L 47/822; H04L 67/1095; H04L 67/28
See application file for complete search history.

(56) References Cited

U.S. PATENT DOCUMENTS

| | | | |
|---|---|---|---|
| 2015/0350047 A1* | 12/2015 | Bird | H04L 67/42 709/224 |
| 2015/0365291 A1* | 12/2015 | Burton | H04L 47/70 709/226 |
| 2017/0063986 A1* | 3/2017 | Gopal | H04L 67/1095 |

* cited by examiner

*Primary Examiner* — Gil H. Lee
(74) *Attorney, Agent, or Firm* — Nicholson De Vos Webster & Elliott LLP

(57) ABSTRACT

A method and system for responding to requests for network resources implemented in a cloud computing infrastructure are described. A proxy server responds to requests from client devices based on the state of the origin instances that serve the requested network resources. The proxy server modifies the state of the origin instance based on whether requests are received for the network resources. The proxy server receives from the client device, a first request for a network resource that is served by an origin server. The proxy server determines a state of the origin instance, where the state of the origin instance indicates whether the origin instance is executing on the cloud computing infrastructure. Upon receipt of the state of the origin instance, the proxy server determines based on the received state, a response to be transmitted to the client device.

18 Claims, 10 Drawing Sheets

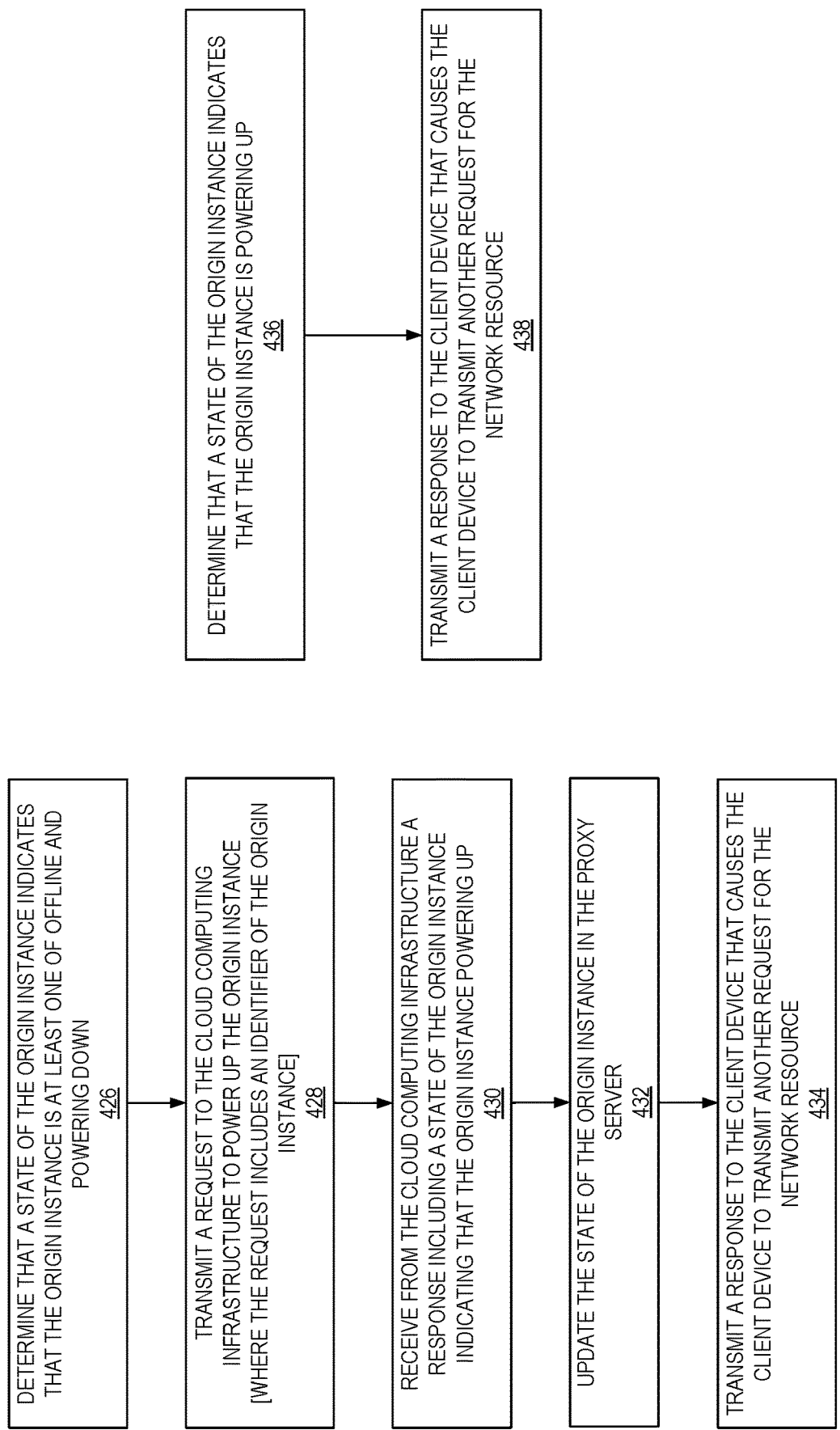

METHODS AND APPARATUSES FOR RESPONDING TO REQUESTS FOR NETWORK RESOURCES IMPLEMENTED IN A CLOUD COMPUTING INFRASTRUCTURE

CROSS-REFERENCE TO RELATED APPLICATIONS

This application claims the benefit of U.S. Provisional Application No. 62/952,018, filed Dec. 20, 2019, which is hereby incorporated by reference.

FIELD

Embodiments of the invention relate to the field of network services; and more specifically to mechanisms for responding to requests for network resources served by an origin server implemented in a cloud computing infrastructure.

BACKGROUND

The infrastructure-as-a-service (IaaS) is a form of cloud computing infrastructure that provides virtualized computing resources over the internet. IaaS is one of the three main categories of cloud computing services, alongside software as a service (SaaS) and platform as a service (PaaS). Businesses and other entities increasingly use infrastructure-as-a-service vendors to host network resources instead of purchasing and maintaining computer hardware themselves.

In cloud computing environments, network resources can be instantiated on the physical infrastructure to provide access to multiple users/visitors of the network resources. The network resources are accessed in an origin instance. A set of one or more origin instances form the origin server, which hosts or serves the network resources. The origin instances typically remain active, such that they continuously consume hardware resources of the c loud computing infrastructure to allow availability and reliability of access to the network resources to the users/visitors. However, this causes the owner of the network resources to consume and be charged for the use of physical infrastructure regardless of whether users are actually accessing the network resources.

BRIEF DESCRIPTION OF THE DRAWINGS

The invention may best be understood by referring to the following description and accompanying drawings that are used to illustrate embodiments of the invention. In the drawings:

FIG. 4C illustrates a flow diagram of exemplary operations for responding to a request for a network resource when the origin instance is offline or powering down, according to some embodiments.

FIG. 4D illustrates a flow diagram of exemplary operations for responding to a request for a network resource when the origin instance is powering up, according to some embodiments.

DETAILED DESCRIPTION

Figure 1:
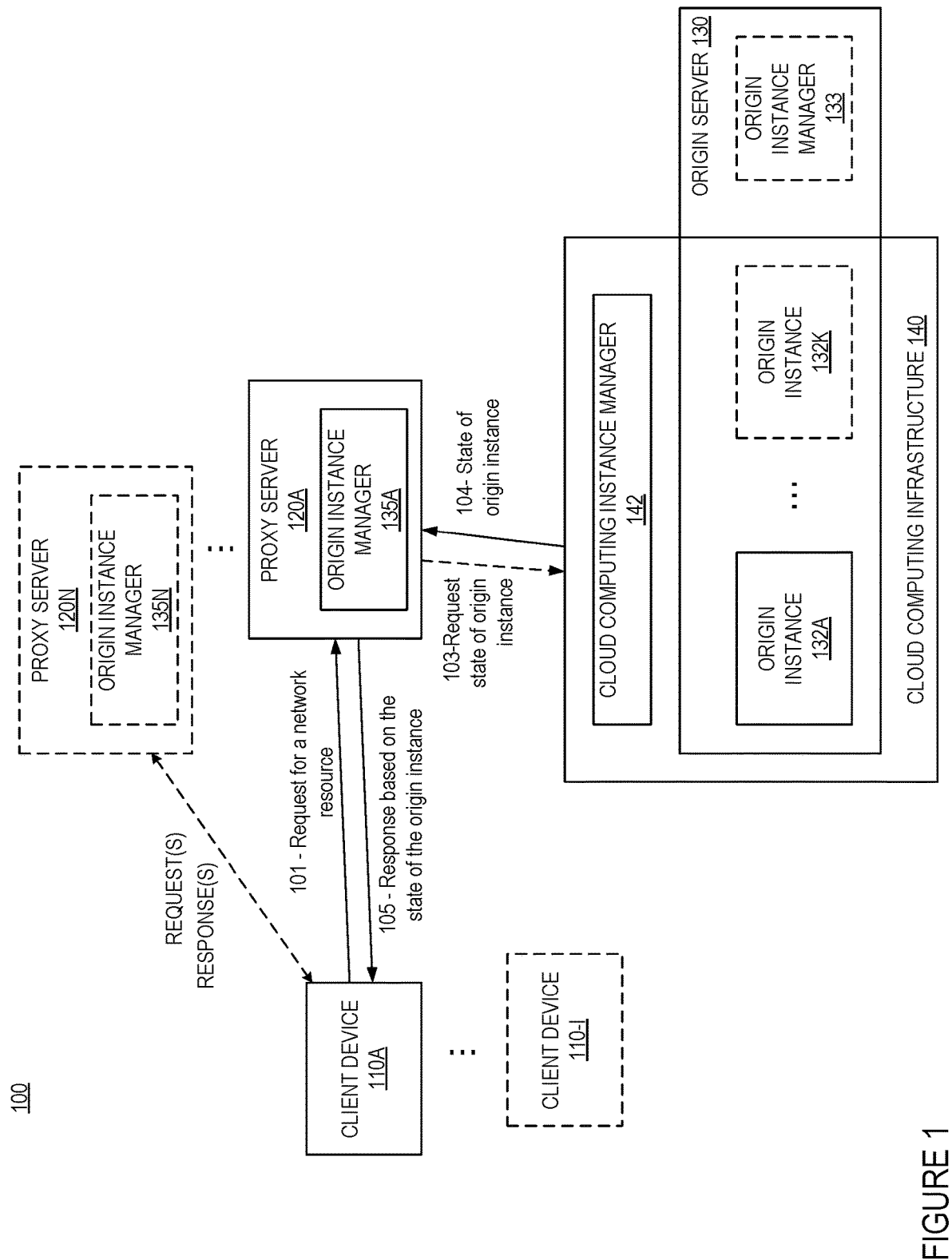
FIG. 1 is a block diagram of an exemplary system for responding to requests for network resources implemented in a cloud computing infrastructure, according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A method and system for responding to requests for network resources implemented in a cloud computing infrastructure are described. A proxy server is operative to respond to requests from client devices based on the state of the origin instances that serve the requested network resources. Further, the proxy server is operative to modify the state of the origin instance based on whether requests are received for the network resources. In some embodiments, the proxy server receives from the client device, a first request for a network resource that is served by an origin server. The proxy server determines a state of the origin instance, where the state of the origin instance indicates whether the origin instance is executing on the cloud computing infrastructure. Upon receipt of the state of the origin instance, the proxy server determines based on the received state, a response to be transmitted to the client device. The state of the origin instance can be one of multiple values (e.g., executing, offline, powering up, powering down) indicating the different stages of execution of the origin instance.

In some embodiments, the state of the origin instance indicates that it is executing in the cloud computing infrastructure. In response to determining that the state of the origin instance indicates that the origin instance is executing, the proxy server transmits a request for the network resource to the origin instance. The origin instance analyses the request and performs one or more action based on the request. The origin instance transmits a response to the proxy server. The proxy server receives, from the origin instance, a first response including the network resource. Upon receipt of the response from the origin instance the proxy server analyzes the response. T In other embodiments, the state of the origin instance indicates that the origin instance, is offline (i.e., it is not executing in the cloud computing infrastructure at the time of the receipt of the request from the client device). In response to determining that the state of the origin instance indicates that the origin instance is offline, the proxy server transmits, to the cloud computing infrastructure, a third request to start execution of the origin instance. The request to start execution of the origin instance causes the origin instance to start executing on the cloud computing infrastructure. The proxy server further transmits, to the client device, a third response that causes the client device to transmit another request for the network resource. In some embodiments, the request may further include an indication that the network resource is not yet available.

The proxy server is further operative to monitor the state of the origin instance(s) and to modify the state of the instance(s) based on the demand received from the client devices. For example, the proxy server is operative to determine, based on a last recorded access time of access of a network resource, whether execution of the origin instance is to be stopped. The embodiments presented herein allow to automatically manage usage of the cloud computing infrastructure for the origin server based on real time requests received for network resource of the origin server. The service offered through the proxy servers (of remotely controlling start of execution of the origin instances) allows the owner of the origin server to not be charged for usage of the cloud computing infrastructure when no requests are received for the network resources. The origin server uses the cloud computing infrastructure only when needed, i.e., when client devices request access to the network resources.

FIG. 1 is a block diagram of an exemplary system for responding to requests for network resources implemented in a cloud computing infrastructure, according to some embodiments. The system 100 includes one or more proxy server 120A-N, a cloud computing infrastructure 140, and one or more client devices 110A-I.

The client devices 110A-I are computing devices (e.g., laptops, workstations, smartphones, palm tops, mobile phones, tablets, gaming systems, set-top boxes, etc.) that are capable of accessing network resources (e.g., they include software such as web browsers, web applications, mobile web applications, that are capable of accessing network resources). Users at the client devices 110A-I request network resources (e.g., web applications, web pages of websites, web servers) through a client network application such as a web browser or other application (e.g., FTP client, SSH client, Telnet client, etc.).

The origin server 130 serves the network resources (e.g., HTML pages, images, word processing documents, PDF files, movie files, music files, or other computer files, web application, web servers, etc.) to the users of the client devices 110A-I. The origin server 130 is implemented at least in part on a cloud computing infrastructure. The origin server 130 may include one or more origin instances 132A-K, which when are executed on the cloud computing infrastructure provide the requested network resources to the client devices 110A-I. Each origin instance 132A-K is operative to receive and respond to requests for network resources (e.g., from an HTTP request, FTP request, telnet request, or other requests allowing access of resources in a network etc.). Although not illustrated in FIG. 1, it should be understood that the network resources of the origin instances 132A-K may be stored separately from the device that responds to the requests. In some embodiments, the origin server 130 may further include an origin instance manager 133 that can be executed on the cloud computing infrastructure 140 or outside of the cloud computing infrastructure 140 on a computing device that is separate from the cloud computing infrastructure. While FIG. 1 illustrates a single origin server 130, in other embodiments, several origin servers can be implemented or instantiated with one or more origin instances on the cloud computing infrastructure 140.

The system 100 also includes a cloud computing infrastructure 140. In some embodiments, the cloud computing infrastructure 140 may be owned by the owner of the origin server 130. In other embodiments, the cloud computing infrastructure 140 may be owned by a third party that is distinct from the owner of the origin server 130 and the owner of the origin server is a customer of the cloud service offered by this third party. Further, typically the owner of the cloud computing infrastructure is different from the owner of the cloud-based proxy service (that include the proxy service), however, in some embodiments, the cloud-based proxy service and the cloud computing infrastructure can be owned and operated by the same entity.

The cloud computing infrastructure 140 is a platform of physical components (e.g., storage components, networking components, and processing components) that can be used by the multiple customers (e.g., owners or origin servers) for instantiation of origin instances 132A-K. Each origin instance, when in execution, is operative to receive requests for network resources and perform one or more action in response to the requests. The cloud computing infrastructure 140 includes a cloud computing instance manager 142. The cloud computing instance manager 142 is operated by the cloud computing infrastructure 140 and provides a set of tools and interfaces for a customer to, among other things, configure code to run in the cloud. The code when run/executed on the physical components of the cloud computing infrastructure 140 cause the instantiation of the origin instances 132A-K. The cloud computing instance manager 142 is operative to receive requests from the proxy servers and transmit responses to these request to the proxy server.

The cloud computing instance manager 142 is further operative to control the origin instances 132A-K by starting or stopping the execution of the origin instances. In some embodiments, the control of the execution of the origin instances 132A-K is performed based on the requests received from the client devices 110A-I.

Each one of the proxy servers 120A-N is a computing device that is situated between the client devices 110A-I and the origin server 130 and provides many of the features of a cloud-based proxy service. Certain network traffic passes through the proxy server 120A (traffic sent from the client devices 110A-I and/or traffic sent from the origin server 130). Based at least in part on this traffic, the proxy server 120 provides a set of one or more services for the benefit of the customers and/or users of the client devices 110A-I. For example, the proxy server 120 may provide one or more of the following services: participation in a content delivery network by providing cached files of the origin server 130; providing cached copies of files (if available) of the origin server 130 during periods when they are offline; restricting access to the origin server 130 (which may be based on a set of one or more factors such as the characteristics of the requester, the type of request, and the content of the request); scanning the traffic (sent from a client device 110 and/or sent from an origin servers 130) for vulnerabilities (e.g., virus, worm, etc.) and acting accordingly (e.g., blocking the request, alerting the sender and/or receiver of the vulnerability, throttling the connection to slow down the request, etc.); and modifying the content of the request and/or the reply (which may be based on a set of one or more factors such as the content of the request, the content of the reply, and the characteristics of the requester). In some embodiments, each one of the proxy server 120A-N includes a respective origin instance managers 135A-N that is operative to respond to requests for network resources served by the origin server 130 based on the state of the origin instances 132A-K as it will be described in further details. The origin instance managers 135A-N are further operative to modify the state of the origin instances 132A-K based on the demand from the client devices 110A-I.

The proxy servers 120A-N are operative to offer a cloud-based proxy services (hereinafter "service") to one or more customers. The service, which is available over the Internet and does not require customers (e.g., owners of network resources (e.g., website, application, web-server, etc.) and/or personnel working on behalf of the network resources' owner to install hardware or software, allows customers (e.g., owners of the network resources) to protect their network against Internet-based threats; empower fast, reliable, and robust performance from their network resources; assist in protecting the Internet community by proactively stopping botnets, cleaning viruses, trojans, and worms; or any combination thereof. In some embodiments, the service provides performance services for the customers. For example, the service can participate in a content delivery network (CDN) and dynamically cache customer's files closer to visitors. Unlike other products that require installation of hardware or software, the service described herein exists at the network level (and thus does not require customers to install hardware or software).

As used herein, a visitor is an entity causing an instance of a client network application (e.g., a web browser, an FTP (File Transfer Protocol) client, an SSH (Secure Shell) client, a Telnet client, a web application, etc.) implementing a network protocol to access the network resources through a network (e.g., the Internet). A visitor can be a human user or a bot (a software application that automatically performs Internet related tasks). Examples of bots include search engines or other crawlers (e.g., email harvesters, indexers, etc.). In some embodiments, the service can enable network resources that operate on cloud computing infrastructure to adapt the use of the cloud computing infrastructure for implementation of the network resources based on the demand providing from the visitors/users of the network resources. The service allows its customers to make an efficient use of the cloud computing infrastructure based on the demand received from the visitors of the network resources. For example, the service allows an automatic start and stop of the execution of the origin instances 132A-K based on requests received from the client devices 110A-N for the network resources.

In some embodiments the service has multiple proxy servers that are geographically distributed. For example, in some embodiments, the service uses multiple point of presences (POPs). A POP is a collection of networking equipment (e.g., authoritative name servers and proxy servers) that are geographically distributed to decrease the distance between requesting client devices and the network resources. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

In some embodiments, customers register for the service by changing their authoritative name server to an authoritative name server of the service, and also changing the IP address(es) that resolve to their origin server(s) (which hosts content of their domain) to point to a proxy server of the service. In other embodiments, customers of the service change individual DNS records to point to a proxy server (or point to other domain(s) that point to a proxy server of the service). For example, the customers may change their DNS records to point to a CNAME that corresponds with a proxy server of the service. Regardless of the embodiment, requests from visitors for actions to be performed on identified resources served by the customer's origin server are received at the proxy server 120A instead of being received at the origin server 130.

The client devices 110A-I request DNS resolution when a domain name is used or requested by a local application and is not known (e.g., is not in a local DNS cache or the DNS record in its local cache has expired). Consider the following example, where a user of the client device 110A enters the website example.com into a web browser of the device (the origin server 130 serves the website example.com). If the client device 110A does not know the IP address of example.com, (e.g., the cache on the client device 110A does not have an entry for example.com or it has expired), the client device makes a DNS request to a DNS system for the IP address for example.com. The domain owner of example.com has changed its authoritative name server to the authoritative name server, and the DNS zone file has been changed so that the IP address returned by the authoritative name server will be that of the proxy server 120A. As such, the DNS system performs a recursive or iterative DNS process until the authoritative name server returns the IP address for the proxy server 120 in the DNS response.

Sometime after the DNS resolution is complete and the client device 110A learns the IP address that points to example.com (which is the IP address of the proxy server 120), the client device 110A makes the request 154 (e.g., an HTTP GET request, an HTTP POST request, other HTTP request method, or other request for an action to be performed on an identified resource belonging to an origin server), which is transmitted to the proxy server 120. The proxy server 120 analyzes the request and determines a set of one or more request related actions to perform based on the results of the analyzing.

The proxy server analyzes the requests and performs one or more request related actions. For example, for each request, analyzing the request includes performing one or more of the following: determining whether the visitor making the request is allowed access to the requested network resource; determining whether the visitor poses an Internet security threat (e.g., is a bot, is infected with a virus or other vulnerability, etc.); determines whether the request itself poses an Internet security threat (e.g., an SQL injection attack, etc.); determines whether the request is malformed; determines the type and/or size of the requested content; determines whether the origin server is offline; and determines whether the requested network resource is accessible. Based on the results of the analyzing, the proxy server 120A takes appropriate request related actions. For example, the proxy server may respond to the request locally (e.g., by blocking the request, displaying an indication that the visitor may be infected with a virus, worm, or other vulnerability, serving cached content, etc.), may transmit the request to the appropriate origin instance for processing, may transmit a response to the client device without transmitting the request to the origin instance, and may modify the request before it is transmitted to the appropriate origin instance for processing.

The responses from the origin servers may also pass through the proxy server, which may analyze the response and perform one or more response related actions. For example, the proxy server may perform one or more of the following when analyzing the response: determining whether the response poses an Internet security threat (e.g., whether the content includes a virus, worm, or other vulnerability); determining whether the response includes one or more elements that are to be excluded from being delivered to the visitor; determining whether to modify element(s) of the response; determining whether to obfuscate elements of the response (e.g., obfuscating an email address such that it will be displayed on the rendered page but obfuscated from the page source); determining whether to add content to the response; and determining whether to cache the contents. Based the results of the analyzing, the proxy server takes appropriate response related actions. In some embodiments, the appropriate response related actions include modifying the response before it is transmitted.

The owner of the proxy server 120A is typically different than the owner of the origin server 130. In addition, the proxy server 120A is not typically part of the local network of the origin web servers 130. For example, the proxy server 120A is outside of the local area network of the origin web server 130 and is typically not physically accessible by owners/administrators of the origin server 130.

The proxy server 120A is operative to respond to requests from the client device 110A based on the state of the origin instance that serves the network resources. Further, the proxy server 120A is operative to modify the state of the origin server based on whether requests are received for the network resources. In some embodiments, the proxy server 120A receives from the client device 110A, a first request 101 for a network resource that is served by an origin server 130. The proxy server 120A determines a state of the origin instance, where the state of the origin instance indicates whether the origin instance is executing on the cloud computing infrastructure 140 and is operative to respond to the request for the network resource from the client device 110A. The proxy server 120A may determine the state of the origin instance by transmitting a request 103 to the cloud computing infrastructure 140 for the state of the origin instance. In other embodiments, the proxy server 120A may have previously received a state of the origin instance indicating the current state of the origin instance without the need for transmitting a request to the cloud computing infrastructure 140. For example, the proxy server 120A may receive the state of the origin server as a result of a subscription to events that indicates a change in the state of the origin instance. Upon receipt of the state of the origin instance, 104, the proxy server 120A determines based on the received state, a response 105 to be transmitted to the client device 110A.

In some embodiments, the state of the origin instance indicates that the origin instance, e.g., 132A, is executing in the cloud computing infrastructure 140. In response to determining that the state of the origin instance indicates that the origin instance is executing, the proxy server 120A transmits a request for the network resource to the origin instance. The origin instance analyses the request and performs one or more action based on the request. The origin instance transmits a response to the proxy server 120A. The proxy server 120A receives, from the origin instance 132A, a first response including the network resource. Upon receipt of the response from the origin instance the proxy server 120A analyzes the response. The proxy server 120A transmits, to the client device 110A, a second response including the network resource. In some embodiments, prior to transmitting the response to the client device 110A, the proxy server 120A may perform one or more actions such as ensuring that the response is not malicious. In some embodiments, the proxy server 120A may modify the response prior to transmitting it to the client device 110A.

In other embodiments, the state of the origin instance indicates that the origin instance, e.g., 132A, is offline (i.e., it is not executing in the cloud computing infrastructure 140 at the time of the receipt of the request from the client device 110A). In response to determining that the state of the origin instance indicates that the origin instance is offline, the proxy server 120A transmits, to the cloud computing infrastructure 140, a third request to start execution of the origin instance. The request to start execution of the origin instance causes the origin instance 132A to start executing on the cloud computing infrastructure. The proxy server 120A further transmits, to the client device 110A, a third response that causes the client device to transmit another request for the network resource. In some embodiments, the request may further include an indication that the network resource is not yet available.

Figure 2A:
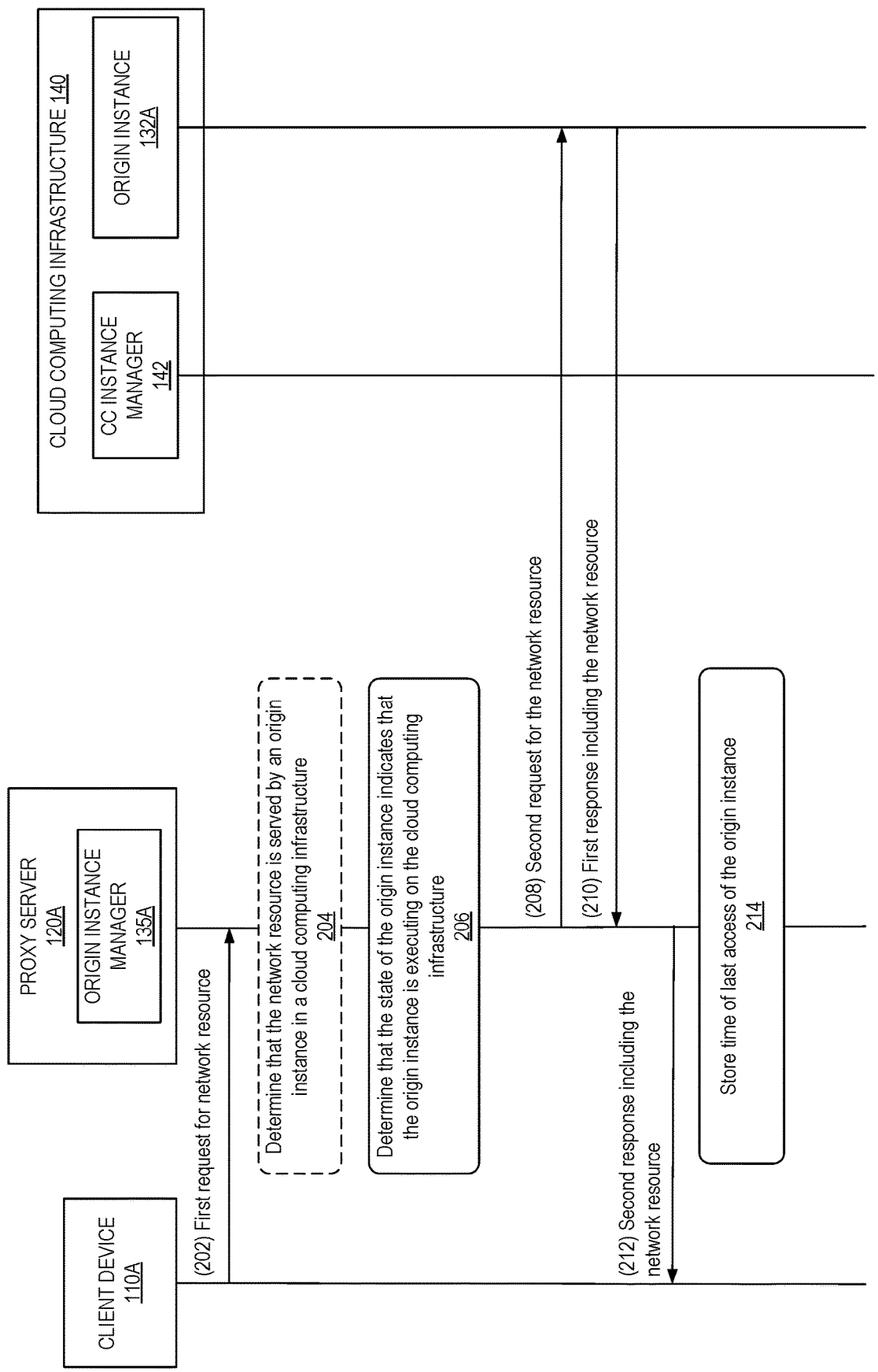
FIG. 2A is a block diagram illustrating exemplary operations for responding to a request for a network resource when the origin instance is executing on the cloud computing infrastructure, according to some embodiments.

FIG. 2A is a block diagram illustrating exemplary operations for responding to a request for a network resource when the origin instance is executing on the cloud computing infrastructure, according to some embodiments. At operation 202, the proxy server 120A receives, from the client device 110A, a first request for a network resource that is served by the origin server 130. At operation 206, the proxy server 120A determines that the state of the origin instance indicates that the origin instance is executing in the cloud computing infrastructure 140. For example, the origin instance manager 135 may store for each origin server (e.g., origin server 130), remote management credentials, origin instance identifier(s), origin instance state(s), and a time since last access for each origin instance. The remote management credentials enable the origin instance manager to access the cloud computing infrastructure and to perform a start or stop instance request for a given origin instance. The origin instance identifier is provided by the cloud computing infrastructure to uniquely identify the origin instance. The origin instance state is a parameter that indicates whether the origin server is one of executing, powering up, powering down, or offline state. When the state of the origin instance is executing this is an indication that the origin instance is running on the cloud computing infrastructure and is operative to receive and process requests for the network resources. When the state of the origin instance is powering up, it is an indication that the origin instance is in the process of loading in the cloud computing infrastructure and will likely to be available shortly for receiving and processing request for the network resources. When the state of the origin instance is powering down, it is an indication that the origin instance is in the process of shutting down and will shortly be offline and unavailable to receive or process requests for the network resources. When the state of the origin instance is offline, it is an indication that the origin instance is shut down and is unavailable to receive or process requests for the network resources.

In some embodiments, prior to determining the state of the origin instance, the proxy server 120A determines that the requested network resource is served by an origin instance in a cloud computing infrastructure, at optional operation 204. In these embodiments, different network resources (e.g., web application, websites, etc.) may be associated with different origin servers and each origin servers may be implemented through the instantiation of one or more origin instances that serve the network resource. In some embodiments, each origin instance is associated with the instance identifier that uniquely identifies the origin instance. At operation 204, the proxy server 120 determines the origin instance identifier that is associated the requested network resource.

At operation 208, in response to determining that the state of the origin instance indicates that the origin instance is executing, the proxy server 120A transmits a request for the network resource to the origin instance 132A. The origin instance 132A analyses the request and performs one or more action based on the request. At operation 210, the origin instance transmits a first response to the proxy server 120A. The proxy server 120A receives, from the origin instance 132A, the first response including the network resource. Upon receipt of the response from the origin instance the proxy server 120A analyzes the first response. At operation 212, the proxy server 120A transmits, to the client device 110A, a second response including the network resource. In some embodiments, prior to transmitting the response to the client device 110A, the proxy server 120A may perform one or more actions such as ensuring that the response is not malicious. In some embodiments, the proxy server 120A may modify the response prior to transmitting it to the client device 110A. The proxy server 120A further stores a time of last access of the origin instance, at operation 214. The time stored is an indication of the last time the network resource has been accessed by transmitting a request for the network resource to the origin instance that is running on the cloud computing infrastructure.

Figure 2B:
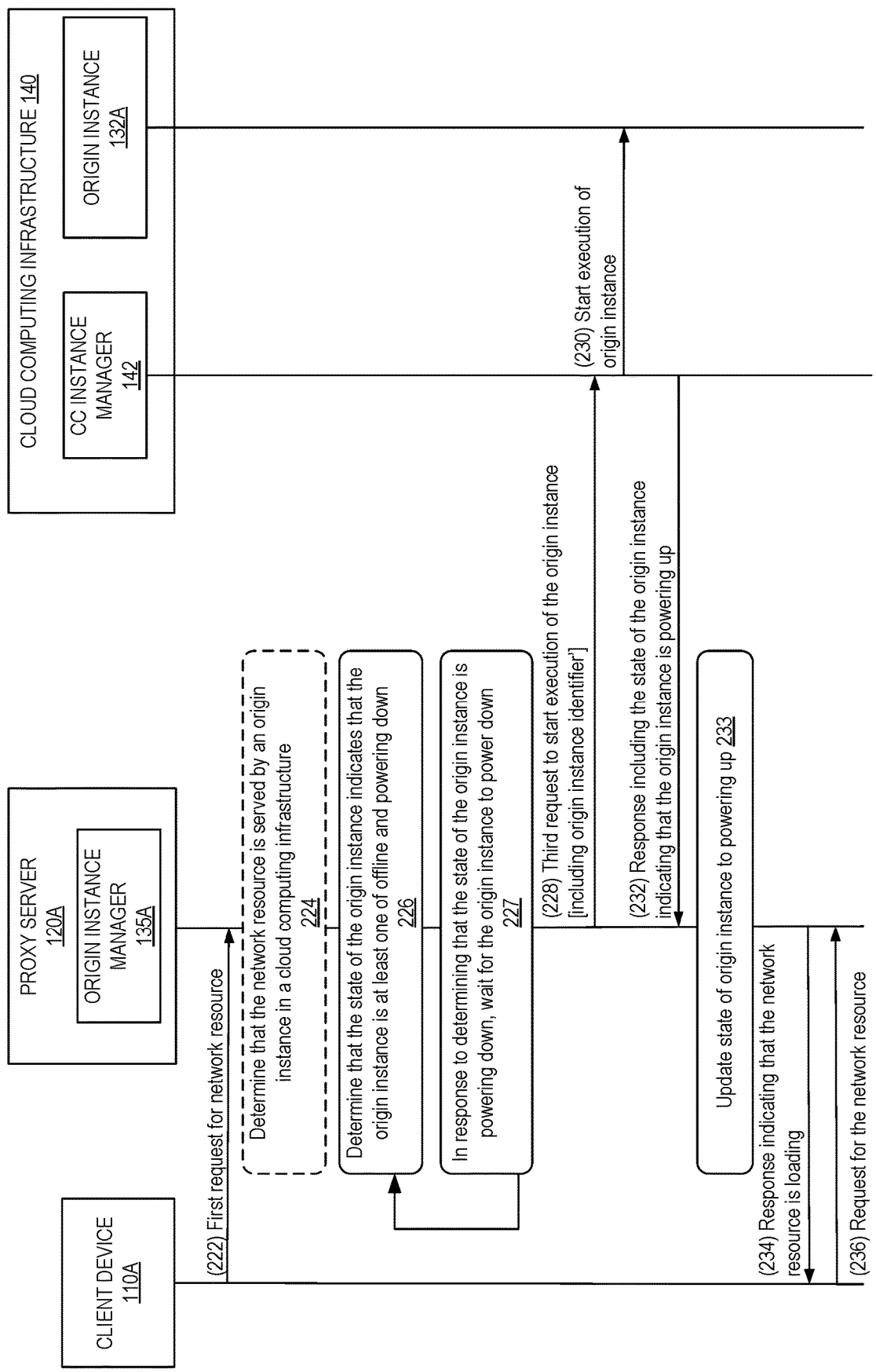
FIG. 2B is a block diagram illustrating exemplary operations for responding to a request for a network resource when the origin instance is offline or in the process of powering down, according to some embodiments.

FIG. 2B is a block diagram illustrating exemplary operations for responding to a request for a network resource when the origin instance is offline or in the process of powering down, according to some embodiments. At operation 222, the proxy server 120A receives, from the client device 110A, a first request for a network resource that is served by the origin server 130. At operation 226, the proxy server 120A determines that the state of the origin instance indicates that the origin instance is either offline or in the process of powering down (i.e., execution of the origin instance is being turned off) in the cloud computing infrastructure 140. In some embodiments, prior to determining the state of the origin instance, the proxy server 120A determines that the requested network resource is served by an origin instance in a cloud computing infrastructure, at optional operation 224. In these embodiments, different network resources (e.g., web application, websites, etc.) may be associated with different origin servers and each origin servers may be implemented through the instantiation of one or more origin instances that serve the network resource. In some embodiments, each origin instance is associated with an instance identifier that uniquely identifies the origin instance. At operation 224, the proxy server 120 determines the origin instance identifier that is associated with the origin instance 132A that serves the requested network resource.

In some embodiments, the state of the origin instance is determined to be "powering down." Responsive to determining that the state of the origin instance 132A is powering down, the proxy server 120A waits for the origin instance to power down. The proxy server 120A may repeat the operation of determining the state of the origin instance until the state of the origin instance is determined to be offline indicating that the origin instance has stopped executing on the cloud computing infrastructure 140.

Upon determining that the state of the origin instance indicates that the origin instance 132A is offline (i.e., it is not executing in the cloud computing infrastructure 140), the proxy server 120A transmits, to the cloud computing infrastructure 140, a request to start execution of the origin instance, at operation 228. For example, the request can be an API request transmitted to the cloud computing instance manager 142, wherein the request instructs the cloud computing instance manager to start execution of the origin instance. In some embodiments, the origin instance can be an instance that was previously instantiated, executed and of which execution has been stopped. In these embodiments, the origin instance may have been persisted in the cloud computing infrastructure and all processes had been stopped from execution. Upon receipt of the instructions to start the execution of the origin instance 132A, the execution of these processes resumes. The origin instance 132A is restored to its previous state, the memory contents are reloaded, and the processes that were previously running on the instance are resumed. Previously attached data volumes are re-attached, and the origin instance retains its instance identifier. In other embodiments, the origin instance can be a new instance that is to be instantiated for the first time for serving the requested network resources.

The cloud computing infrastructure, receives, through the cloud computing instance manager, a remote request for executing an origin instance. The request for execution of the origin instance is received from the proxy server that is located remotely from the cloud computing infrastructure (i.e., not on the local network of the cloud computing infrastructure) and the request is transmitted upon determining that there is a need for network resources served by the origin instance (e.g., a request is received from the client device 110A). The request 230 causes the origin instance 132A to start execution on the cloud computing infrastructure.

The proxy server 120A receives a response from the cloud computing instance manager 142 indicating that the origin instance is powering up (i.e., in the process of loading and starting execution). The proxy server 120A updates, at operation 233, the state associated with the identifier of the origin instance to a "powering up" state. The proxy server 120A further transmits, to the client device 110A, response 234 that causes the client device to transmit another request for the network resource. For example, the response can be an HTTP response including the location of the network resource (e.g., HTTP 302) that causes the network resource to be refreshed. In another example, the response can include an indication to wait for the network resource and can be transmitted in any other types of network resource transmission protocol. In some embodiments, the request may further include an indication that the network resource is not yet available. Upon receipt of the response 234, the client device 110A may transmit another request 236 for the network resource. The flow of operations can then move to the operations of FIG. 2C or alternatively to the operations of FIG. 2A depending on the state of the origin instance upon receipt of the request 236.

Figure 2C:
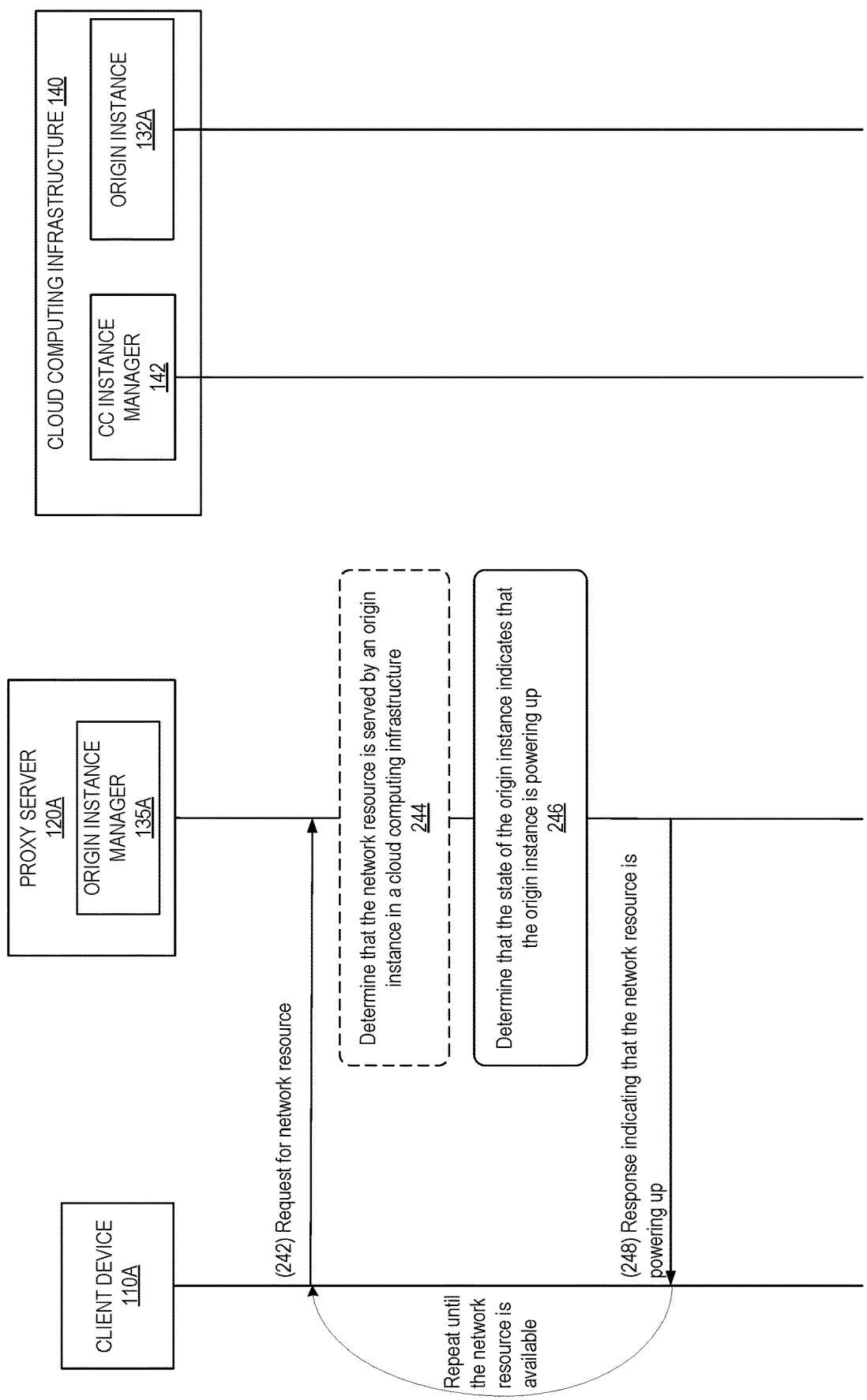
FIG. 2C is a block diagram illustrating exemplary operations for responding to a request for a network resource when the origin instance is powering up, according to some embodiments.

FIG. 2C is a block diagram illustrating exemplary operations for responding to a request for a network resource when the origin instance is powering up, according to some embodiments. At operation 242, the proxy server 120A receives, from the client device 110A, a request for a network resource that is served by the origin server 130. In some embodiments, the proxy server 120A may determine that the network resource is served by an origin instance in a cloud computing infrastructure. The proxy server 120A determines the origin instance identifier associated with the requested network resources. At operation 246, the proxy server 120A determines that the state of the origin instance, identified based on the identifier of the origin instance associated with the requested network resources, indicates that the origin instance is powering up in the cloud computing infrastructure 140. In other words, the state of the origin instance indicates that the origin instance is in the process of loading and is shortly to become available for receiving and processing requests for network resources. Responsive to determining that the state of the origin instance 132A is powering up, the proxy server 120A waits for the origin instance to power up. The proxy server 120A transmits a response 248, to the client device 110A, indicating that the network resource is powering up causing the client device 110A to repeat transmission of the request for the network resource until the origin instance is powered up and its states has been updated to "executing". Upon determining that the state of the origin instance 132A has been updated to "executing," the operations of FIG. 2A are performed.

Figure 3:
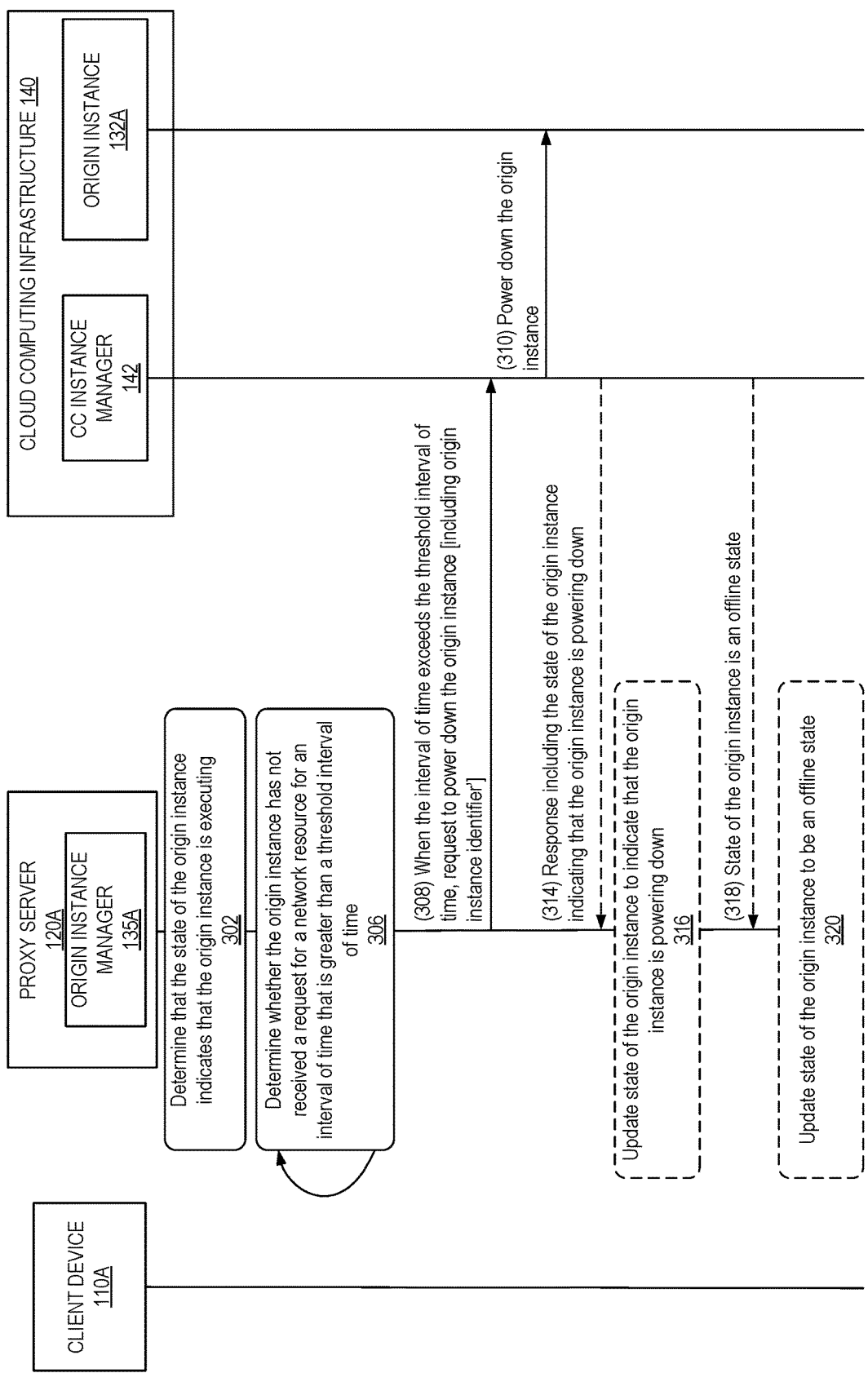
FIG. 3 illustrates a block diagram illustrating exemplary operations for stopping execution of the origin instance, according to some embodiments.

FIG. 3 illustrates a block diagram illustrating exemplary operations for stopping execution of the origin instance, according to some embodiments. The proxy server 120A is operative to monitor the state of each origin instance and to determine based on the requests received for the network resources associated with the origin instance, whether to modify its state. The proxy server 120 may periodically perform the operations 302 and 306. At operation 302, the proxy server 120 determines the state of an origin instance. In some embodiments, the origin instance manager 135A of the proxy server 120 stores identifiers of multiple origin instances that have been instantiated in the cloud computing infrastructure 140. In these embodiments, the origin instance manager 135A determines for each identified origin instance its corresponding state. In some embodiments, the determination of a state of an origin instance is performed based on the operations described with reference to FIG. 6A or FIG. 6B.

In response to determining that the state of the origin instance indicates that the origin instance is executing in the cloud computing infrastructure 140, the origin instance manager 135A determines, at operation 306, whether the network resource has not been accessed for an interval of time that is greater than a threshold interval of time. Each origin instance is associated with a time of last access, which indicates the time at which a request for network resources has been transmitted to the origin instance. Based on the time of last access, the origin instance manager 135A determines whether the interval of time that elapsed since the time of last access is greater than the threshold interval of time. In some embodiments, the threshold interval of time can be configured by the administrator/owner of the origin server 130. In other embodiments, the threshold interval of time can be automatically determined by the cloud-proxy service based on the behavior of requests for the network resources received at one or more proxy servers of the cloud-proxy service.

Upon determining that the time elapsed since the time of last access is not greater than the threshold interval of time, the origin instance manager 135A does not perform any action. The origin instance manager 135A may repeat the operation 306 until it determines that the time elapsed exceeds the threshold interval of time. In other embodiments, the origin instance manager 135A may further determine that the state of the origin instance still indicates that the origin instance is executing. If the state of the origin instance indicates that the origin instance is offline or powering down, the origin instance manager 135A does not perform any action. In some embodiments, both operations 302 and 304 may be periodically repeated until the threshold interval of time is exceeded. In other embodiments, only operation 306 is periodically repeated upon determining that the state of the origin instance indicates that the instance is executing.

Upon determining that the time elapsed since the time of last access time for an origin instance (that is identified based on the unique origin instance identifier) is greater than the threshold interval of time, the origin instance manager 135A transmits, at operation 308, a request to the cloud computing infrastructure 140 to stop execution of the origin instance 132A. The request to stop execution of the origin instance 132A includes the identifier of the origin instance 132A. In some embodiments, the request is an API call transmitted to the cloud computing instance manager 142. The cloud computing instance manager 142, which receives the request, powers down the origin instance 132A, at operation 310. The origin instance 132A starts the processing of powering down. When the powering down process is started the cloud computing manager 142 may transmit, at operation 314, a response to the proxy server 120A including a state of the origin instance 132A, which indicates that the origin instance is powering down. The response includes the identifier of the origin instance 135A and the new state of the origin instance, "powering down," associated with this identifier. Upon receipt of the new state of the origin instance 132A, the origin instance manager 135A updates the state of the origin instance to indicate that the origin instance is powering down. In some embodiments, operations 314 and 316 can be skipped and the proxy server 120A may receive a state of the origin instance indicating that the origin instance is offline (completed the powering down).

In some embodiments, when the origin instance is powered down, this corresponds to hibernating the origin instance. For example, the execution of the origin instance is stopped and the content from the instance's memory (RAM) is persisted such that the origin instance can be restarted upon request. Thus, when the instance is powered down, the multiple processes that were running prior to the receipt of the powering down request are stopped. In some embodiments, upon completion of the power down, the state of the origin instance is changed to "offline." The offline state indicates that the origin instance is no longer running on the cloud computing infrastructure and is no longer available to receive or process requests for network resources. In some embodiments, the cloud computing instance manager 142, upon determining that the origin instance 132A has completed being powered down and is no longer running, may transmit, at operation 318, the new state of the origin instance indicating that the origin instance is offline. The proxy server 120A receives the updated state of the origin instance, which indicates that the origin instance 132A is offline. The message including the state of the origin instance may include the identifier of the origin instance 132A and the updated state. The origin instance manager 135A, updates based on the identifier of the origin instance 135A, the state of the origin instance stored in the proxy server 120A to indicate that the origin instance is offline.

The cloud computing infrastructure, receives, through the cloud computing instance manager, a remote request for stopping execution of an origin instance (e.g., origin instance 132A). The request for stopping execution of the origin instance is received from the proxy server that is located remotely from the cloud computing infrastructure (i.e., not on the local network of the cloud computing infrastructure) and the request is transmitted upon determining that there has been requests received for network resources served by the origin instance for a certain time (e.g., time elapsed since time of last access is greater than the threshold interval of time). The request causes the origin instance 132A to stop execution on the cloud computing infrastructure consequently making efficient use of the resources consumed by the origin server 130 for responding to requests.

The operations in the flow diagrams of FIGS. 4A-D will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4A:
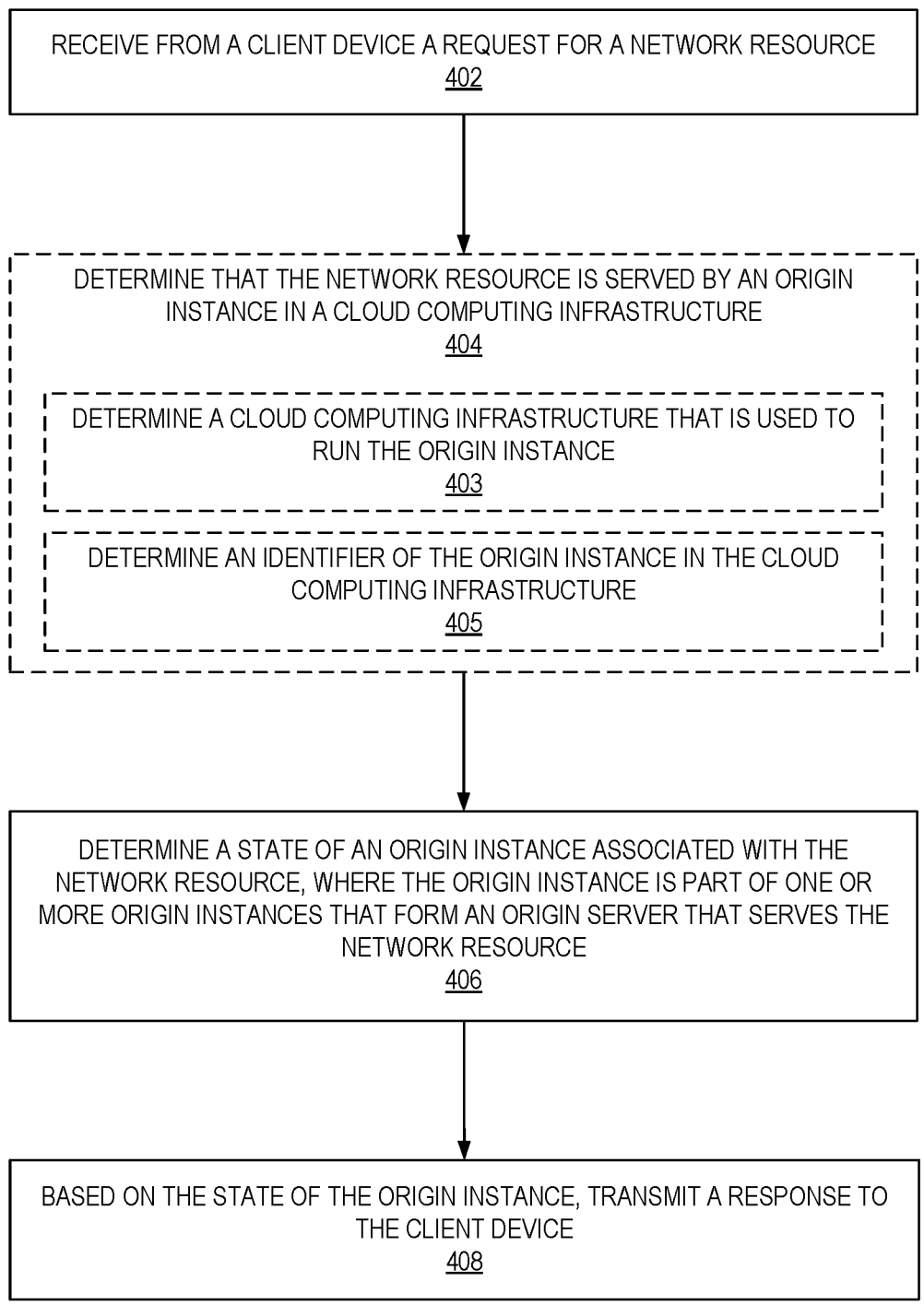
FIG. 4A illustrates a flow diagram of exemplary operations for responding to a request for a network resource based on the state of an origin instance, according to some embodiments.

FIG. 4A illustrates a flow diagram of exemplary operations for responding to a request for a network resource based on the state of an origin instance, according to some embodiments. Depending on the state of an origin instance, a proxy server, e.g., proxy server 120A, that receives a request for a network resource on behalf of the origin instance, performs different actions. For example, the origin instance manager 135 may store for each origin server (e.g., origin server 130), remote management credentials, origin instance identifier(s), origin instance state(s), and a time since last access for each origin instance. The remote management credentials enable the origin instance manager to access the cloud computing infrastructure and to perform a start or stop instance request for a given origin instance. The origin instance identifier is provided by the cloud computing infrastructure to uniquely identify the origin instance. The state is associated with the corresponding origin instance identifier that uniquely identifies the origin instance in the cloud computing infrastructure. Each instance identifier is also associated with a time of last access which represents the time at which the origin instance was last accessed for processing a request for the network resources that is serves.

At operation 402, the proxy server 120A receives, from a client device, e.g., client device 110A, a first request for a network resource that is served by the origin server 130. The flow of operations moves to operation 406, at which the proxy server 120A determines a state of an origin instance associated with the network resource, where the origin instance is part of one or more origin instances that form the origin server, e.g., origin server 130, that serves the network resource. The origin instance state is a parameter that indicates whether the origin server is in one of an executing, a powering up, a powering down, or an offline state. When the state of the origin instance is "executing," this is an indication that the origin instance is running on the cloud computing infrastructure and is operative to receive and process requests for the network resources. When the state of the origin instance is "powering up," it is an indication that the origin instance is in the process of loading in the cloud computing infrastructure and will likely to be available shortly for receiving and processing request for the network resources. When the state of the origin instance is "powering down," it is an indication that the origin instance is in the process of shutting down and will shortly be offline and unavailable to receive or process requests for the network resources. When the state of the origin instance is "offline," it is an indication that the origin instance is shut down and is unavailable to receive or process requests for the network resources.

In some embodiments, prior to determining the state of the origin instance, the proxy server 120A performs operations 404. In some embodiments, the proxy server 120A determines that the requested network resource is served by an origin instance in a cloud computing infrastructure. In these embodiments, different network resources (e.g., web application, websites, etc.) may be associated with different origin servers and each origin servers may be implemented through the instantiation of one or more origin instances that serve the network resource. In some embodiments, the origin servers may further be implemented on different cloud computing infrastructure. The proxy server 120A may determine at operation 403, the cloud computing infrastructure that is used to run the origin instance associated with the requested network resource. The proxy server 120A further determines, at operation 405, the origin instance identifier that is associated the requested network resource. The origin instance identifier uniquely identifies the origin instances in the cloud computing infrastructure.

Figure 4B:
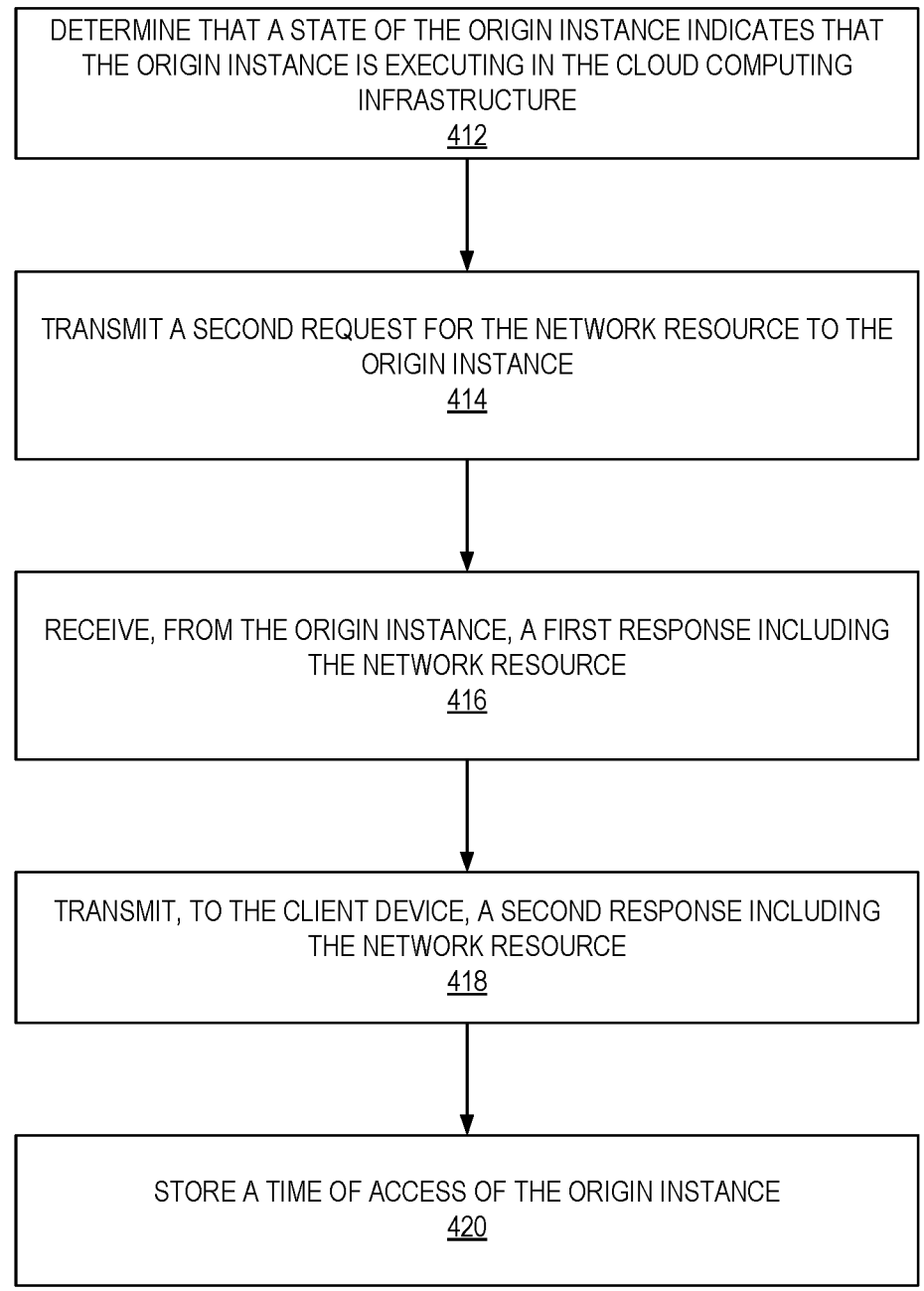
FIG. 4B illustrates a flow diagram of exemplary operations for responding to a request for a network resource when the origin instance is executing or powering down, according to some embodiments.

The flow of operations moves to operation 408, at which the proxy server 120A transmits a response to the client device based on the state of the origin instance. FIGS. 4B-D illustrates the exemplary operations that can be performed by a proxy server based on different states of an origin instance.

FIG. 4B illustrates a flow diagram of exemplary operations for responding to a request for a network resource when the origin instance is executing or powering down, according to some embodiments. At operation 412, the proxy server 120A determines that the state of the origin instance indicates that the origin instance is executing in the cloud computing infrastructure. At operation 414, in response to determining that the state of the origin instance indicates that the origin instance is executing, the proxy server 120A transmits, to the origin instance 132A, a second request for the network resource. The origin instance 132A analyzes the request and performs one or more action based on the request. For example, the origin instance transmits a first response to the proxy server 120A. In some embodiments, the first response may include the requested network resource. In other embodiments, the first response may include a denial of access to the network resource. At operation 416, the proxy server 120A receives, from the origin instance 132A, the first response. In some embodiments, the first response includes the network resource. In other embodiments, the first response includes the denial of access to the network resource. Upon receipt of the response from the origin instance, the proxy server 120A analyzes the first response. At operation 418, the proxy server 120A transmits, to the client device 110A, a second response. The second response may include the network resource. Alternatively, the second response may include a denial of access to the network resource or any other response that was received from the origin instance. In some embodiments, prior to transmitting the response to the client device 110A, the proxy server 120A may perform one or more actions such as ensuring that the response is not malicious. In some embodiments, the proxy server 120A may modify the response prior to transmitting it to the client device 110A. The flow of operations moves to operation 420, at which the proxy server 120A stores a time of last access of the origin instance. The time stored is an indication of the last time the network resource has been accessed by transmitting a request for the network resource to the origin instance running on the cloud computing infrastructure.

FIG. 4C illustrates a flow diagram of exemplary operations for responding to a request for a network resource when the origin instance is offline or powering down, according to some embodiments. At operation 426, the proxy server 120A determines that the state of the origin instance indicates that the origin instance is either offline or in the process of powering down (i.e., execution of the origin instance is being turned off) in the cloud computing infrastructure 140.

In some embodiments, the state of the origin instance is determined to be "powering down." Responsive to determining that the state of the origin instance 132A is powering down, the proxy server 120A may wait for the origin instance to power down prior to transmitting a response to the client device. The proxy server 120A may repeat the operation of determining the state of the origin instance until the state of the origin instance is determined to be offline indicating that the origin instance has stopped executing on the cloud computing infrastructure 140.

Upon determining that the state of the origin instance indicates that the origin instance 132A is offline (i.e., it is not executing in the cloud computing infrastructure 140), the proxy server 120A transmits, to the cloud computing infrastructure 140, a request to start execution of the origin instance, at operation 428. In some embodiments, the request includes an identifier of the origin instance that is to be execution. For example, the request can be an API request transmitted to the cloud computing instance manager 142, where the request instructs the cloud computing instance manager to start execution of the origin instance. In some embodiments, the origin instance can be an instance that was previously instantiated, executed and of which execution has been stopped. In other embodiments, the origin instance can be a new instance that is to be instantiated for the first time for serving the requested network resources. The cloud computing instance manager 142 executes the origin instance 132A in response to receiving the request from the proxy server 120A. Thus, the cloud computing infrastructure, receives, through the cloud computing instance manager, a remote request for executing an origin instance. The request for execution of the origin instance is received from the proxy server that is located remotely from the cloud computing infrastructure (i.e., not on the local network of the cloud computing infrastructure) and the request is transmitted upon determining that there is a need for network resources served by the origin instance (e.g., a request is received from the client device 110A). The request causes the origin instance 132A to start executing on the cloud computing infrastructure. The proxy server 120A is then operative to remotely control execution of one or more origin instances of an origin server based on the demand for the network resources served by the origin server.

The flow of operations moves to operation 430, at which the proxy server 120A receives a response from the cloud computing instance manager 142 indicating that the origin instance is powering up (i.e., in the process of loading and starting execution). The proxy server 120A updates, at operation 432, the state associated with the identifier of the origin instance to a "powering up" state. The proxy server 120A further transmits at operation 434, to the client device 110A, a response that causes the client device to transmit another request for the network resource. For example, the response can be an HTTP response including the location of the network resource (e.g., HTTP 302) that causes the network resource to be refreshed. In another example, the response can include an indication to wait for the network resource and can be transmitted in any other types of network resource transmission protocol. In some embodiments, the request may further include an indication that the network resource is not yet available. Upon receipt of the response, the client device 110A may transmit another request for the network resource. The flow of operations can then move to the operations of FIG. 4D or alternatively to the operations of FIG. 4B depending on the state of the origin instance upon receipt of the new request from the client device 110A.

FIG. 4D illustrates a flow diagram of exemplary operations for responding to a request for a network resource when the origin instance is powering up, according to some embodiments. Upon receipt of a request, from the client device 110A, for a network resource that is served by the origin server 130, the proxy server 120A may perform operations 436 and 438. In some embodiments, the request received from the client device can be a second request received from the same client device for the network resources hosted by the origin server 130. This second request follows a first request for the network resource that caused the proxy server 120A to request the execution of the origin instance to start (as described with reference to FIG. 4C). In another embodiment, the request from the client device can be a request received from another client device, which is different from the client device that caused the start of the execution of the origin instance in the cloud computing infrastructure.

At operation 436, the proxy server 120A determines that the state of the origin instance, identified based on the identifier of the origin instance associated with the requested network resources, indicates that the origin instance is powering up in the cloud computing infrastructure 140. In other words, the state of the origin instance indicates that the origin instance is in the process of loading and is shortly to become available for receiving and processing requests for network resources. Responsive to determining that the state of the origin instance 132A is powering up, the proxy server 120A waits for the origin instance to power up. At operation 438, the proxy server 120A transmits a response, to the client device, indicating that the network resource is powering up causing the client device to transmit another request for the network resource. This process may be repeated until the origin instance is powered up and its state is updated to "executing." Upon determining that the state of the origin instance 132A has been updated to "executing," the operations of FIG. 4B are performed.

Figure 5:
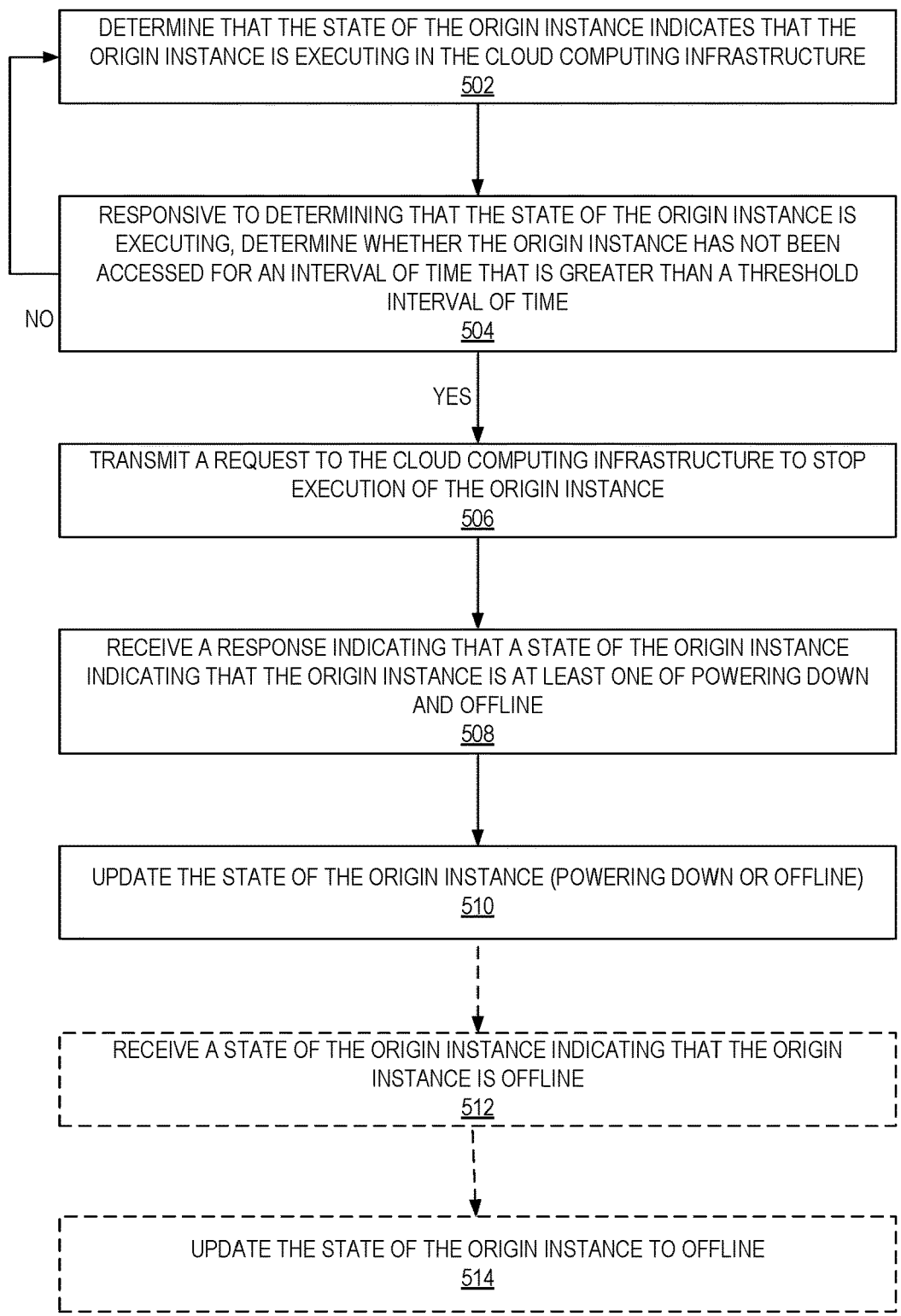
FIG. 5 illustrates a flow diagram of exemplary operations for stopping execution of an origin instance, according to some embodiments.

FIG. 5 illustrates a flow diagram of exemplary operations for stopping execution of an origin instance, according to some embodiments. The proxy server 120A is operative to monitor the state of each origin instance and to determine based on the requests received for the network resources associated with the origin instance, whether to modify its state. The proxy server 120 may periodically perform the operations 502 and 504. At operation 502, the proxy server 120 determines the state of an origin instance. In some embodiments, the origin instance manager 135A of the proxy server 120 stores identifiers of multiple origin instances that have been instantiated in the cloud computing infrastructure 140. In these embodiments, the origin instance manager 135A determines for each identified origin instance its corresponding state. The proxy server 120A may determine the state of the origin instance by transmitting a request to the cloud computing infrastructure 140 for the state of the origin instance. In other embodiments, the proxy server 120A may have previously received a state of the origin instance indicating the current state of the origin instance without the need for transmitting a request to the cloud computing infrastructure 140. For example, the proxy server 120A may receive the state of the origin server as a result of a subscription to events that indicates a change in the state of the origin instance. Upon receipt of the state of the origin instance, 104, the proxy server 120A stores the state in association with the identifier of the origin instance. The proxy server 120A then determines the state of the origin instance by looking up the stored value that is associated with the identifier of the origin instance.

In response to determining that the state of the origin instance indicates that the origin instance is executing in the cloud computing infrastructure 140, the origin instance manager 135A determines, at operation 306, whether the network resource has not been accessed for an interval of time that is greater than a threshold interval of time. Each origin instance is associated with a time of last access, which indicates the time at which a latest request for network resources has been transmitted to the origin instance. Based on the time of last access, the origin instance manager 135A determines whether the interval of time that elapsed since the time of last access is greater than the threshold interval of time. In some embodiments, the threshold interval of time can be configured by the administrator/owner of the origin server 130. In other embodiments, the threshold interval of time can be automatically determined by the cloud-proxy service based on the behavior of requests for the network resources received at one or more proxy servers of the cloud-proxy service.

Upon determining that the time elapsed since the time of last access is not greater than the threshold interval of time, the origin instance manager 135A does not perform any action. The origin instance manager 135A may repeat the operation 506 until it determines that the time elapsed exceeds the threshold interval of time. In other embodiments, the origin instance manager 135A may further determine that the state of the origin instance still indicates that the origin instance is executing. If the state of the origin instance indicates that the origin instance is offline or powering down, the origin instance manager 135A does not perform any action. In some embodiments, both operations 502 and 504 may be periodically repeated until the threshold interval of time is exceeded. In other embodiments, only operation 506 is periodically repeated upon determining that the state of the origin instance indicates that the instance is executing.

Upon determining that the time elapsed since the time of last access time for an origin instance (that is identified based on the unique origin instance identifier) is greater than the threshold interval of time, the origin instance manager 135A transmits, at operation 506, a request to the cloud computing infrastructure 140 to stop execution of the origin instance 132A. The request to stop execution of the origin instance 132A includes the identifier of the origin instance 132A. In some embodiments, the request is an API call transmitted to the cloud computing instance manager 142. The cloud computing instance manager 142, which receives the request, powers down the origin instance 132A. The origin instance 132A starts the processing of powering down. When the powering down process is started the cloud computing manager 142 may transmit a response to the proxy server 120A including a state of the origin instance 132A, which indicates that the origin instance is powering down. The response includes the identifier of the origin instance 135A and the new state of the origin instance, "powering down," associated with this identifier. At operation 508, the proxy server 120A receive the new state of the origin instance 132A indicating that the origin instance is powering down. At operation 510, the origin instance manager 135A of the proxy server 120A updates the state of the origin instance to indicate that the origin instance is powering down. In some embodiments, operations 508 and 510 can be skipped and the proxy server 120A may receive a state of the origin instance indicating that the origin instance is offline (completed the powering down) without receiving the state indicating that the origin instance is powering down.

In some embodiments, when the origin instance is powered down/offline, this corresponds to hibernating the origin instance. For example, the execution of the origin instance is stopped and the content from the instance's memory (RAM) is persisted such that the origin instance can be restarted upon request. Thus, when the instance is powered down, the multiple processes that were running prior to the receipt of the powering down request are stopped. In some embodiments, upon completion of the power down, the state of the origin instance is changed to "offline." The offline state indicates that the origin instance is no longer running on the cloud computing infrastructure and is no longer available to receive or process requests for network resources. In some embodiments, the cloud computing instance manager 142, upon determining that the origin instance 132A has completed being powered down and is no longer running, may transmit the new state of the origin instance indicating that the origin instance is offline. The proxy server 120A receives, at operation 512, the updated state of the origin instance, which indicates that the origin instance 132A is offline. The message including the state of the origin instance may include the identifier of the origin instance 132A and the updated state. At operation 514, the origin instance manager 135A, updates based on the identifier of the origin instance 135A, the state of the origin instance stored in the proxy server 120A to indicate that the origin instance is offline.

The cloud computing infrastructure, receives, through the cloud computing instance manager, a remote request for stopping execution of an origin instance (e.g., origin instance 132A). The request for stopping execution of the origin instance is received from the proxy server that is located remotely from the cloud computing infrastructure (i.e., not on the local network of the cloud computing infrastructure) and the request is transmitted upon determining that there has been requests received for network resources served by the origin instance for a certain time (e.g., time elapsed since time of last access is greater than the threshold interval of time). The request causes the origin instance 132A to stop execution on the cloud computing infrastructure consequently making efficient use of the resources consumed by the origin server 130 for responding to requests.

Figure 6:
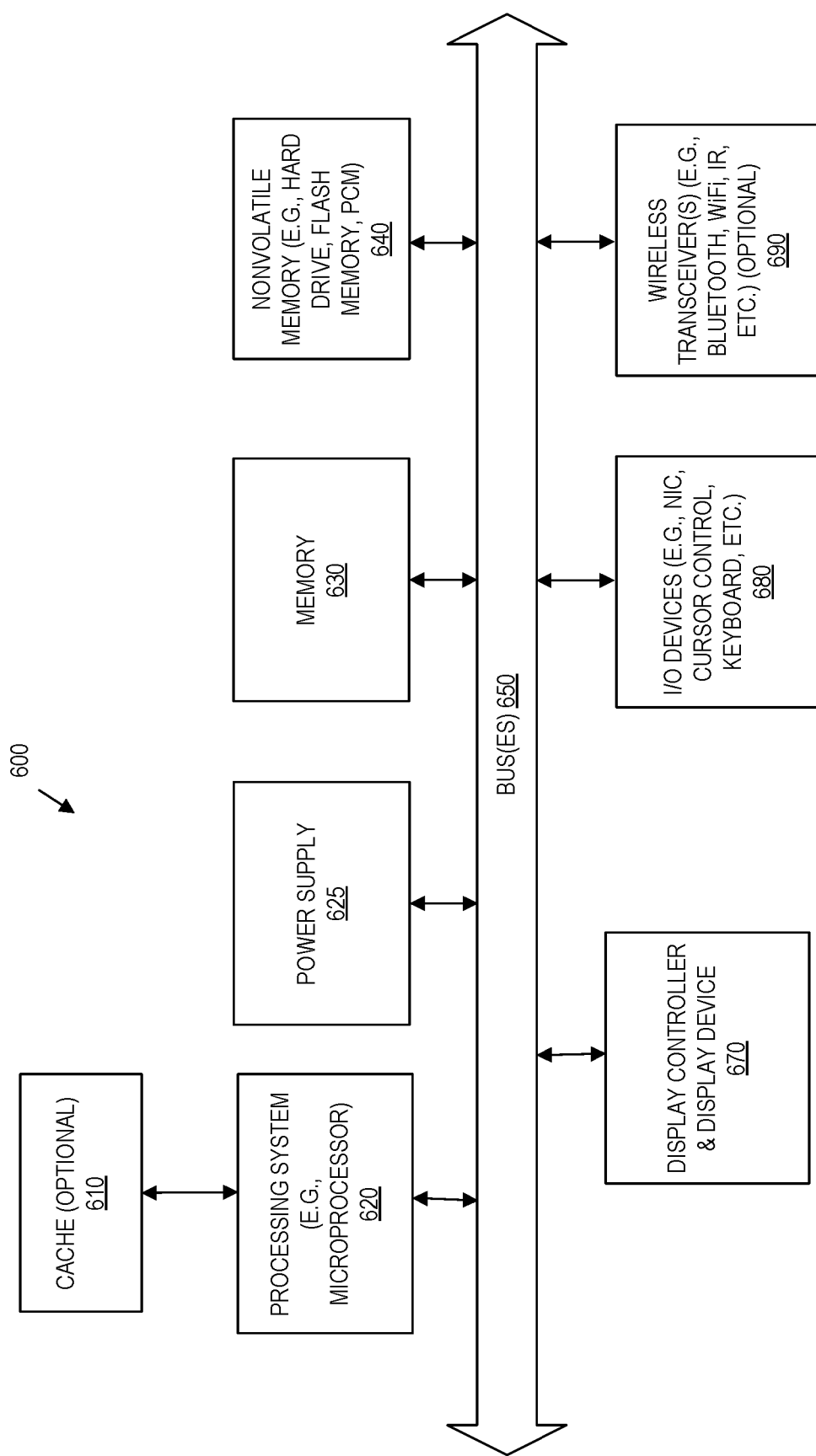
FIG. 6 illustrates a block diagram illustrating an exemplary data processing system that may be used in some embodiments.

FIG. 6 illustrates a block diagram illustrating an exemplary data processing system that may be used in some embodiments. As illustrated in FIG. 6, the computer system 600, which is a form of a data processing system, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). In one embodiment, the client devices 110A-I, the service server 125, the proxy server 120, the validating domain server 180, and/or the origin server 130 can take the form of the computer system 600.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server of a cloud-based proxy service, the method comprising:
   receiving from a first client device a first request for a first network resource;
   determining that a first state of a first origin instance associated with the first network resource indicates that the first origin instance is executing in a cloud computing infrastructure, wherein the first origin instance is part of a plurality of origin instances that form an origin server that serves the first network resource, and responsive to this determination, performing the following:
      transmitting, to the first origin instance, a second request for the first network resource,
      receiving, from the first origin instance, a first response including the first network resource, and
      transmitting, to the first client device, a second response including the first network resource;
   receiving from a second client device a third request for a second network resource; and
   determining that a second state of a second origin instance associated with the second network resource indicates that the second origin instance is offline, and responsive to this determination, performing the following:
      transmitting, to the cloud computing infrastructure, a fourth request to start execution of the second origin instance, and
      transmitting, to the second client device, a third response that causes the client device to transmit a fifth request for the second network resource.

2. The method of claim 1, wherein further responsive to determining that the first state of the first origin instance associated with the first network resource indicates that the first origin instance is executing in the cloud computing infrastructure, further performing the following:
   storing a time of last access of the first network resource.

3. The method of claim 2, further comprising:
   determining that the first network resource has not been accessed for an interval of time that is greater than a threshold interval of time, and responsive to this determination, performing the following:
      transmitting a sixth request to the cloud computing infrastructure to stop execution of the first origin instance,
      receiving a fourth response from the cloud computing infrastructure indicating that the first origin instance is no longer executing on the cloud computing infrastructure, and
      updating the first state of the first origin instance.

4. The method of claim 3,
wherein the fourth response indicates that the first origin instance is powering down, and
wherein updating the first state of the first origin instance includes indicating that the first origin instance is powering down.

5. The method of claim 3,
wherein the fourth response indicates that the first origin instance is offline, and
wherein updating the state of the first origin instance includes indicating that the first origin instance is offline.

6. The method of claim 1 further comprising:
receiving from a third client device a sixth request for a third network resource; and
determining that a third state of a third origin instance associated with the third network resource indicates that the third origin instance is powering down, transmitting, to the third client device, a fourth response that causes the third client device to transmit a seventh request for the third network resource.

7. A proxy server comprising:
one or more processors; and
a non-transitory computer readable storage medium that stores code, which when executed by the one or more processors causes the proxy server to perform the following operations:
receiving from first client device a first request for a first network resource;
determining that a first state of a first origin instance associated with the first network resource indicates that the first origin instance is executing in a cloud computing infrastructure, wherein the first origin instance is part of one or more a plurality of origin instances that form an origin server that serves the first network resource, and responsive to this determination, performing the following:
transmitting, to the first origin instance, a second request for the first network resource,
receiving, from the first origin instance, a first response including the first network resource, and
transmitting, to the first client device, a second response including the first network resource;
receiving from a second client device a third request for a second network resource; and
determining that a second state of a second origin instance associated with the second network resource indicates that the second origin instance is offline, and responsive to this determination, performing the following:
transmitting, to the cloud computing infrastructure, a fourth request to start execution of the second origin instance, and
transmitting, to the second client device, a third response that causes the client device to transmit a fifth request for the second network resource.

8. The proxy server of claim 7, further responsive to determining that the first state of the first origin instance associated with the first network resource indicates that the first origin instance is executing in the cloud computing infrastructure, further performing the following:
storing a time of last access of the first network resource.

9. The proxy server of claim 8, further comprising:
determining that the first network resource has not been accessed for an interval of time that is greater than a threshold interval of time, and responsive to this determination, performing the following:
transmitting a sixth request to the cloud computing infrastructure to stop execution of the first origin instance,
receiving a fourth response from the cloud computing infrastructure indicating that the first origin instance is no longer executing on the cloud computing infrastructure, and
updating the first state of the first origin instance.

10. The proxy server of claim 9,
wherein the fourth response indicates that the first origin instance is powering down, and
wherein updating the first state of the first origin instance includes indicating that the first origin instance is powering down.

11. The proxy server of claim 9,
wherein the fourth response indicates that the first origin instance is offline, and
wherein updating the state of the first origin instance includes indicating that the first origin instance is offline.

12. The proxy server of claim 7, wherein the operations further comprise:
receiving from a third client device a sixth request for a third network resource; and
determining that a third state of a third origin instance associated with the third network resource indicates that the third origin instance is powering down, transmitting, to the third client device, a fourth response that causes the third client device to transmit a seventh request for the third network resource.

13. A non-transitory computer readable storage medium that stores instructions which when executed by one or more processors of a proxy server cause said processors to perform operations comprising:
receiving from a first client device a first request for a first network resource;
determining that a first state of a first origin instance associated with the first network resource indicates that the first origin instance is executing in a cloud computing infrastructure, wherein the first origin instance is part of a plurality of origin instances that form an origin server that serves the first network resource, and responsive to this determination, performing the following:
transmitting, to the first origin instance, a second request for the first network resource,
receiving, from the first origin instance, a first response including the first network resource, and
transmitting, to the first client device, a second response including the first network resource;
receiving from a second client device a third request for a second network resource; and
determining that a second state of a second origin instance associated with the second network resource indicates that the second origin instance is offline, and responsive to this determination, performing the following:
transmitting, to the cloud computing infrastructure, a fourth request to start execution of the second origin instance, and
transmitting, to the second client device, a third response that causes the client device to transmit a fifth request for the second network resource.

14. The non-transitory computer readable storage medium of claim 13, wherein further responsive to determining that the first state of the first origin instance associated with the first network resource indicates that the first origin instance is executing in the cloud computing infrastructure, further performing the following:

storing a time of last access of the first network resource.

15. The non-transitory computer readable storage medium of claim 14, further comprising:

determining that the first network resource has not been accessed for an interval of time that is greater than a threshold interval of time, and responsive to this determination, performing the following:

transmitting a sixth request to the cloud computing infrastructure to stop execution of the first origin instance, receiving a fourth response from the cloud computing infrastructure indicating that the first origin instance is no longer executing on the cloud computing infrastructure, and updating the first state of the first origin instance.

16. The non-transitory computer readable storage medium of claim 15, wherein the fourth response indicates that the first origin instance is powering down, and wherein updating the first state of the first origin instance includes indicating that the first origin instance is powering down.

17. The non-transitory computer readable storage medium of claim 15, wherein the fourth response indicates that the first origin instance is offline, and wherein updating the state of the first origin instance includes indicating that the first origin instance is offline.

18. The non-transitory computer readable storage medium of claim 13, wherein the operations further comprise:

receiving from a third client device a sixth request for a third network resource; and determining that a third state of a third origin instance associated with the third network resource indicates that the third origin instance is powering down, transmitting, to the third client device, a fourth response that causes the third client device to transmit a seventh request for the third network resource.

* * * * *